United States Patent

Cornelison et al.

[11] Patent Number: 5,240,682
[45] Date of Patent: Aug. 31, 1993

[54] REINFORCED CORRUGATED THIN METAL FOIL STRIP USEFUL IN A CATALYTIC CONVERTER CORE, A CATALYTIC CONVERTER CORE CONTAINING SAID STRIP AND AN ELECTRICALLY HEATABLE CATALYTIC CONVERTER CONTAINING SAID CORE

[75] Inventors: Richard C. Cornelison, Hiram; William A. Whittenberger, Ravenna, both of Ohio

[73] Assignee: W. R. Grace & Co. -Conn., New York, N.Y.

[21] Appl. No.: 696,132

[22] Filed: May 6, 1991

[51] Int. Cl.⁵ .................................................. F01N 3/10
[52] U.S. Cl. ................................... 422/174; 422/179; 422/180; 422/199; 502/439; 502/527; 55/520; 55/521; 55/DIG. 30; 60/300; 60/322
[58] Field of Search ............... 422/174, 177, 179, 180, 422/199; 502/439, 527; 55/DIG. 30, 520, 521; 60/300, 322

[56] References Cited

U.S. PATENT DOCUMENTS

| | | | |
|---|---|---|---|
| 3,723,070 | 3/1973 | Houdry | 23/288 F |
| 3,768,982 | 10/1973 | Kitzner et al. | 23/288 F |
| 3,770,389 | 10/1973 | Kitzner et al. | 23/288 F |
| 3,857,680 | 12/1974 | Porta et al. | 23/288 K |
| 3,886,739 | 6/1975 | Lee | 60/286 |
| 3,889,464 | 6/1975 | Gardner | 60/286 |
| 3,992,330 | 11/1976 | Noakes et al. | 252/466 J |
| 4,015,566 | 4/1977 | Wahl | 123/117 R |
| 4,023,928 | 5/1977 | Haensel | 21/74 R |
| 4,029,974 | 6/1977 | Brokaw | 307/296 R |
| 4,078,379 | 3/1978 | Minami et al. | 60/276 |
| 4,102,127 | 7/1978 | Saiki et al. | 60/284 |
| 4,186,172 | 1/1980 | Scholz | 422/180 |
| 4,272,668 | 6/1981 | Johnson et al. | 219/375 |
| 4,277,442 | 7/1981 | Hergart | 422/119 |
| 4,381,590 | 5/1983 | Nonnenmann et al. | 29/157 |
| 4,382,323 | 5/1983 | Chapman et al. | 422/180 |
| 4,414,023 | 11/1983 | Aggen et al. | 75/124 |
| 4,598,063 | 7/1986 | Retallick | 502/439 |
| 4,665,051 | 5/1987 | Nonnemann | 502/439 |
| 4,693,078 | 9/1987 | Dettling et al. | 60/295 |
| 4,702,892 | 10/1987 | Betz | 422/171 |
| 4,711,009 | 12/1987 | Cornelison et al. | 29/157 |
| 4,719,680 | 1/1988 | Cyron | 502/527 |
| 4,847,230 | 7/1989 | Cyron | 502/439 |
| 4,847,966 | 7/1989 | Kuchelmeister | 29/157 |
| 4,852,530 | 9/1989 | John | 123/145 A |
| 4,911,894 | 3/1990 | Retallick et al. | 422/174 |
| 4,923,109 | 5/1990 | Cyron | 502/527 |
| 4,928,485 | 5/1990 | Whittenberger | 60/299 |

FOREIGN PATENT DOCUMENTS

WO89/10470 11/1989 Fed. Rep. of Germany .

OTHER PUBLICATIONS

"Recent Developments in Electrically Heated Metal Monoliths" Whittenberger et al; SAE Technical Paper Series 900503 Feb. 26, 1990.
Analog Devices: "Thermocouple Conditioner and Set-Point Controller" AD596/AD597.
Motorola Semiconductor Technical Data MC68H811A2.
Allied Metglas Products-Catalogue Sheet.

Primary Examiner—Lynn M. Kryza
Attorney, Agent, or Firm—Edward J. Cabic

[57] ABSTRACT

There is provided an improved reinforced corrugated thin stainless steel strip in which either or both of the longitudinal edges are overfolded to increase the thickness and stiffness of the foil to better resist the tendency to failure in a severe hot-shake screening test. There is also provided a core and an electrically heatable catalytic converter containing the core for use in the exhaust line of an internal combustion engine.

19 Claims, 3 Drawing Sheets

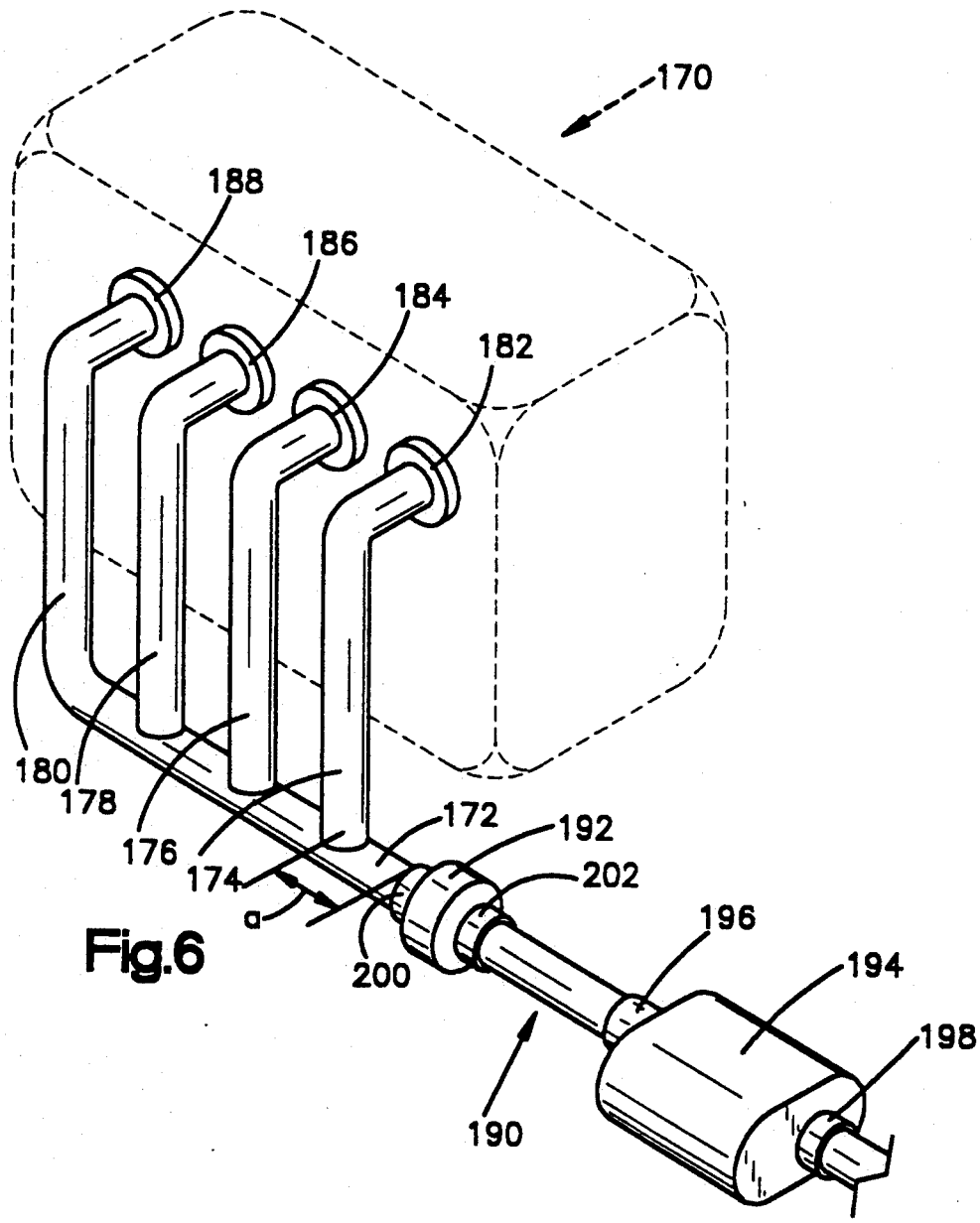

REINFORCED CORRUGATED THIN METAL FOIL STRIP USEFUL IN A CATALYTIC CONVERTER CORE, A CATALYTIC CONVERTER CORE CONTAINING SAID STRIP AND AN ELECTRICALLY HEATABLE CATALYTIC CONVERTER CONTAINING SAID CORE

This invention relates to a corrugated thin metal foil strip, and more particularly, to a corrugated thin metal foil strip having reinforced longitudinal edges. These strips are especially useful for fabricating polycellular metal monoliths particularly for use in catalytic converters for internal combustion engines.

BACKGROUND OF THE INVENTION AND PRIOR ART

The purpose of a catalytic converter is to facilitate conversion of pollutant materials in internal combustion engine exhaust, e.g., carbon monoxide, unburned hydrocarbons, nitrogen oxides, etc. to carbon dioxide, water, nitrogen and other harmless gases. Conventional catalytic converters utilize a ceramic honeycomb monolith having square, triangular, or circular, straight-through openings or cells, catalyst coated alumina beads, or a corrugated thin metal foil honeycomb monolith. These monoliths are characterized by having a catalyst carried on or supported by the surface, which surface is, in the case of the thin metal honeycomb monolith, typically washcoated with one or more refractory metal oxides, e.g., alumina (gamma), ceria, lanthia, or combinations thereof, and a catalyst. The catalyst is normally a noble metal, e.g., platinum, palladium, rhodium, ruthenium, or a mixture of two or more of such metals. The catalyst may also be manganese hexa-aluminate developed by Kobe Steel, Ltd. The catalyst catalyzes a chemical reaction whereby the pollutant material is converted to a harmless by-product which then passes through the exhaust system to the atmosphere.

However, this conversion is not efficient initially when the exhaust gases are relatively cold. To have high conversion efficiency, for example, at start-up, the catalyst and the surface with which the exhaust gases come in contact must be at a minimum elevated temperature, e.g., 390 F. for carbon monoxide, 570 F. for volatile organic compounds (VOC) and 1000 F. for methane or natural gas. Otherwise, conversion to harmless by-products is poor and cold start pollution of the atmosphere is high. Once the exhaust system has come to its normal operating temperature, the catalytic converter is optimally effective. Hence, it is necessary for the relatively cold exhaust gases to contact a catalyst with very low thermal inertia of preferably, a hot catalyst to effect satisfactory conversion at start-up.

A polycellular corrugated thin metal honeycomb monolith having a catalyst deposited on the surface thereof is especially adapted to this purpose in that it can be heated readily by electrical means as described in our copending application Ser. No. 07/680,763 filed Apr. 5, 1991 entitled Composite Catalytic Converter, to which reference may be had, and which copending application is incorporated herein by reference thereto. This application specifically discloses alternative means for reinforcing the leading edge of the corrugated thin metal strip useful as heatable catalytic supports.

To achieve rapid heating of the catalyst in a metallic monolith by electrical means, it is necessary to draw a large amount of power from a voltage source or another source of electrical energy, e.g., a battery or a capacitor device, such as the new Isuzu "electric power storage" device developed by Isuzu Motors, Ltd. for a short period of time until the desired catalyst temperature is reached. In an automotive vehicle, for example, this source of electrical energy is usually a 12 volt or 24 volt battery, although a battery system supplying up to as much as 108 volts may be used herein. To accomplish a high power draw on a storage battery system, it has been found that one or more actuatable solid state switches connected in parallel, such as metal oxide semiconductor field effect transistors (MOSFETs), together with means for actuating such devices in unison (a gate driver) may conveniently be used. Such a system enables drawing high power loads for a short period of time sufficient to achieve the desired catalyst temperature of about 650 F. in from 2 to 30 seconds. Reference may be had to our copending application Ser. No. 587,219 filed Sep. 24, 1990 for details of a suitable power control system useful herein.

Reference may be had to U.S. Pat. No. 3,768,982 to Kitzner dated Oct. 30, 1973. In this patent, heat from a centrally located electric heater is transferred by conduction through a monolith catalyst support to heat the catalyst to optimum operating temperature. Reference may also be had to U.S. Pat. No. 3,770,982 to Kitzner dated Oct. 30, 1973 which discloses a central electrically heated core within a ceramic monolith. The heating core is formed of metal sheets, one corrugated and the other flat, coated with alumina and also bearing a catalyst. The metallic core is heated electrically by virtue of its own electrical resistance. However, heating by conduction requires too long a period (a matter of minutes) to be practical in solving the problem of atmospheric pollution at start-up.

Reference may also be had to U.S. Pat. No. 4,711,009 to Cornelison et al dated Dec. 8, 1987 for details of a process for the preparation of a continuous corrugated thin stainless steel strip having a wash coat of alumina (gamma) on at least one surface of the strip, and a noble metal catalyst deposited on the resulting surface thereof. This patent is incorporated herein by reference thereto.

The process described in U.S. Pat. No. 4,711,009 may be modified by including in the apparatus after the initial heat treating or annealing station, an edge overfolding station in which at least one edge is reverse folded one or more times upon the balance of the strip to multiply the thickness along the length of the strip edge. In the preferred configuration, the folded over portion, or hem, is seam welded continuously or intermittantly to the parent foil. Also, the overfolding may occur along both edges of the strip, although for most purposes, only what will become the leading edge of the accordion folded strip or the spirally wound strip requires reinforcement by multiplying the thickness of the strip. The greater thickness of the leading edge also enhances heat transfer. In general, folding of the leading edge prevents flutter due to the impingement of turbulent, hot gases. Folding at the trailing edge prevent crushing or collapse of the monolith especially in hot cyclic service, and in particular, the hot shake tests. Corrugation is done after the overfolding step. From that point on, the process is essentially as disclosed in the aforesaid patent. For conventional converters, accordion folding of the corrugated thin metal strip may be used. For electrically heatable catalytic converters, a series of layered elongated strips are used. Instead of accordion folding an elongated strip to form the monolith, a strip of predetermined length may be cut from the continuous strip and spirally wound about a central core as described in the aforesaid application Ser. No. 680,763.

Reference may also be had to International PCT publication numbers WO 89/10470 and WO 89/10471 each filed Nov. 2, 1989 which disclose electrically conductive honeycomb catalyst support units useful in automobiles. S-wound cores are disclosed in these publications.

To applicant's knowledge, no reference discloses a corrugated thin metal foil having a reinforced leading or trailing edge formed by overfolding one or both edges. The edge of the corrugated thin metal strip which first comes in contact with the exhaust gases is deemed to be the "leading edge."

In the following description, reference will be made to "ferritic" stainless steel. A suitable formulation for this alloy is described in U.S. Pat. No. 4,414,023 dated Nov. 8, 1983 to Aggens et al. A specific ferritic stainless steel alloy useful in forming the corrugated thin metal strips hereof contains 20% chromium, 5% aluminum, from 0.002% to 0.05% of at least one rare earth metal selected from cerium, lanthanum, neodymium, yttrium, and praseodymium, or a mixture of two or more rare earths, balance iron and steel making impurities.

In the following description, reference may be made to fibrous mat or insulation. Reference may be had to U.S. Pat. No. 3,795,524 dated Mar. 5, 1974 to Bowman for formulations and manufacture of ceramic fibers and mats useful herein. One such material is currently available from 3-M under the registered trademark "INTERAM."

In the following description reference will also be made to brazing foil. This foil is cast and/or rolled to about 0.001" to about 0.003" thick. It is desirably a nickel-chromium-boron-silicon brazing alloy analyzing 75% to 83% nickel with a liquidus temperature of 2100 F. to 2300 F. Other nickel-containing brazing alloys contain 7% to 14% chromium, 3% to 4.5% iron, 3.5% to 4.5% silicon, 2% to 3% boron, balance nickel and having a liquidus temperature above about 2100 F. may also be used. Phosphorus in the alloy is to be avoided where platinum is used as the catalyst. Such alloys are currently available from Allied Metglas Products in Parsippany, N.J.

Many millions of automotive vehicles are equipped with catalytic converters, but virtually all are subject to start-up emissions of what, in at least one state, has been determined to be an unacceptable level. Anticipatory elevation of the catalyst temperature to an optimum operating level before start-up is expected to be mandated for many, if not all cars.

The metal monolith devices utilize, in the preferred embodiments, an elongated thin metal strip with reinforced edges, corrugated in such a manner as to be nonnesting when accordion folded, or when spirally wound about a central core. The corrugations may be, therefore, herringbone, truncated herringbone (as shown in FIG. 4 of U.S. Pat. No. 4,838,067 to Cornelison dated Jun. 13, 1989, chevron shaped or sinusoidally shaped, having a V-cross section with the apices truncated or rounded to reduce stress. The corrugations may be straight-through according to a variable pitch scheme such as described in U.S. Pat. No. 4,810,588 to Bullock and Whittenberger dated Mar. 7, 1989. The sloping sides of the herringbone, or chevron patterned corrugations define an angle of from 3 to 10 degrees, e.g., 5 degrees, to a line normal to the edges of the strip.

There is a tendency for the leading edges, particularly, of corrugated thin metal foil strips at high gas space velocities on the order of 1,000,000 volume/volume/hour to roll over and induce destruction of the catalytic converter unit. To overcome this problem, it has now been found that reinforcing the leading edge and optionally the trailing edge of the corrugated thin stainless steel foil strip by overfolding an edge of the foil strip a distance of from 5% to 40% of the width of the final strip thereby doubling or quadrupling the thickness of the foil in the edge region(s) avoid this problem.

BRIEF STATEMENT OF THE INVENTION

Briefly stated, the present invention is a corrugated thin stainless steel foil strip having at least one overfolded edge wherein at least one longitudinal edge is folded through 180 degrees toward the center of the strip a distance of from about 5% to about 25% of the final width of the strip. After the strip is folded, it is corrugated in a nonnesting pattern, e.g., herringbone or chevron, or variable pitch straight-through. The amount of overfolding in terms of the thickness buildup, may be from 2 to 4 times the original thickness. Ordinarily, the stainless steel foil has a thickness of from about 0.001 to about 0.005", e.g., 0.0016". Ferritic stainless steel is the preferred material for the corrugated strips hereof.

BRIEF DESCRIPTION OF THE DRAWINGS

The invention will be better understood by having reference to the annexed drawings showing a preferred embodiment of the invention and wherein:

FIG. 6 shows in diagrammatic and schematic form an internal combustion engine and an exhaust system containing an electrically heatable catalytic converter in accordance herewith and a conventional catalytic converter in tandem relation.

DETAILED DESCRIPTION OF THE EMBODIMENTS IN THE DRAWINGS

Figure 5:
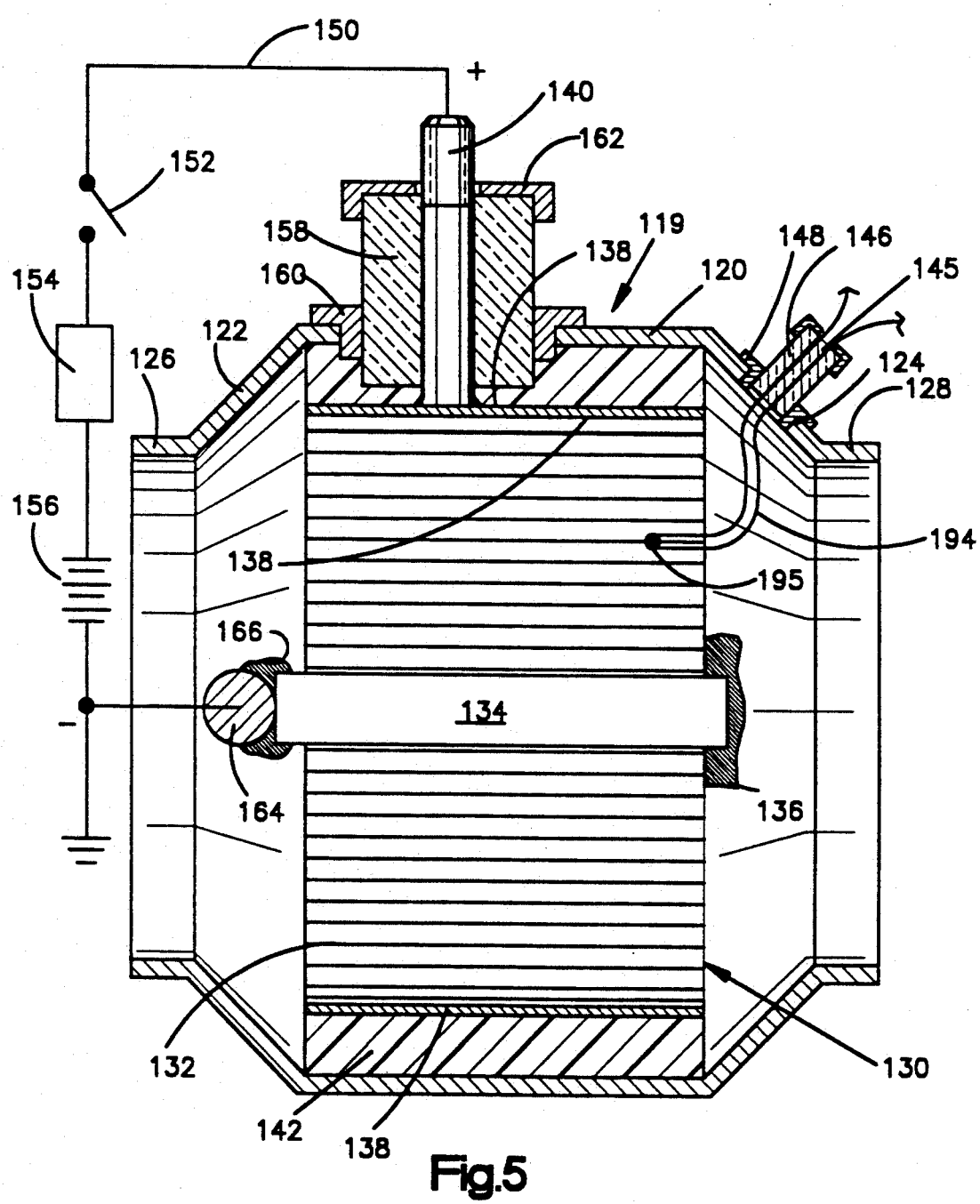
FIG. 5 is a cross-sectional view of an electrically heatable catalytic converter including a core element in accordance herewith, with the attendant electrical circuit diagrammatically shown.

As indicated above, strength is a limitation with spirally wound and accordion folded corrugated thin metal foil monoliths, especially those having high pitch and amplitude values for the corrugations, for example 0.1" to 0.2" pitch and 0.04" to 0.15" amplitude. In general, the pitch is in the range of from about 0.02" to about 0.2" and the amplitude in the range of from about 0.02" to about 0.25". There is a tendency under sever screening tests for the leading edge of the foil to roll over and eventually destroy the integrity of the monolith core. This test involves oscillating (100 to 200 Hertz and 28 to 60 G) the device (such as shown in FIG. 5) in a vertical attitude at a high temperature (between 850 C. and 950 C.; 1562 F. and 1742 F., respectively) with exhaust gas from a running internal combustion engine being passed through the device. If the device telescopes, breaks up, or experiences "roll over" or bending or distortion of the leading edges after a predetermined time, e.g., 5 to 200 hours, the device is said to fail the test. Usually the device will fail in 5 hours if it is going to fail.

This invention is similar to the invention described in the aforesaid application Ser. No. 680,763 except that instead of using as reinforcing means a separate brazing strip (co-wound and fused) or a separate flat strip co-wound with the corrugated strip, the reinforcing means in the present case is integral with the corrugated strip, i.e. it is an overfolded marginal portion. It has been found that this means is as effective as the prior means for reinforcing the leading edge (and, if desired, the trailing edge) against the type of failure experienced in the foregoing screening test. Moreover, although it requires modification of the apparatus of U.S. Pat. No. 4,711,009, supra, to incorporate conventional metal overfolding means in the process line prior to the corrugating gears as described in that patent, the modification cost is compensated for by the ease of manufacture compared to those costs involved in handling plural strips.

Figure 1:
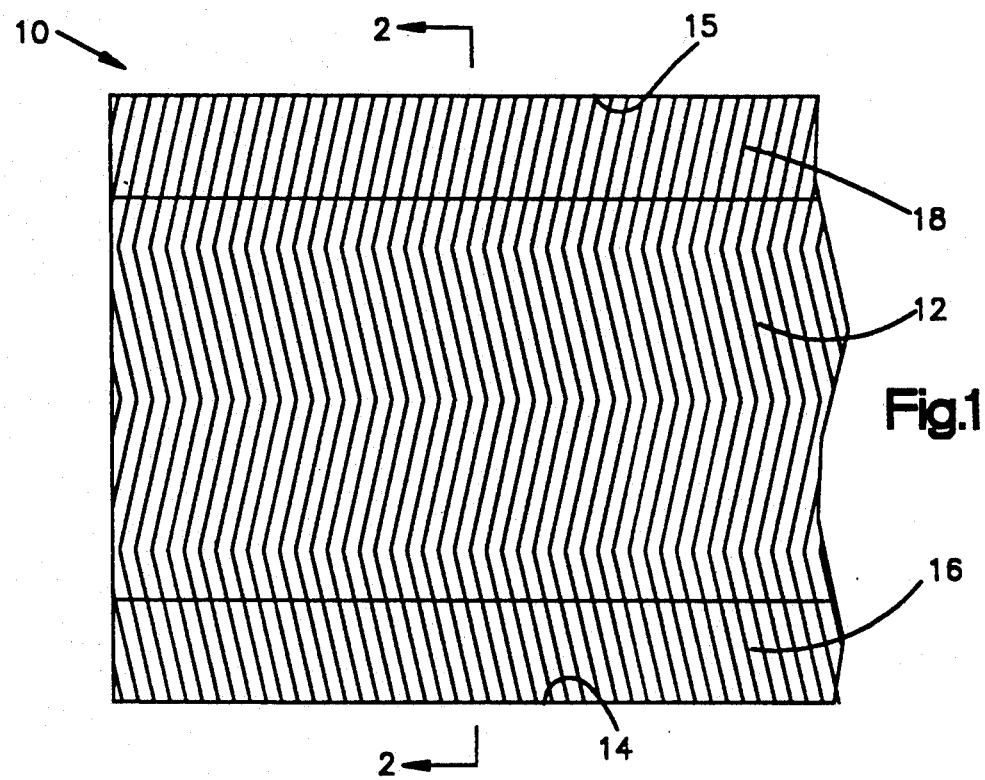
FIG. 1 is a top view of a section of a herringbone corrugated strip in accordance with this invention showing an overfolded portion along the left longitudinal edge, and in phantom, an optional overfolded portion along the right longitudinal edge.
Figure 2:
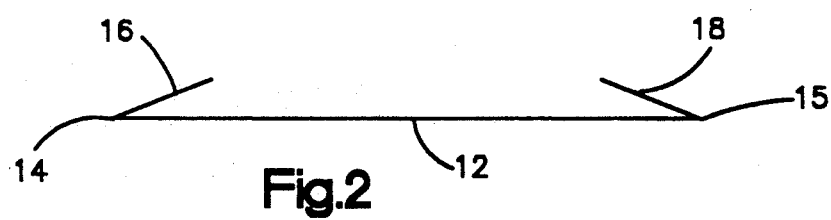
FIG. 2 is a cross-sectional view of the strip section as it appears in the plane indicated by the line 2—2 in FIG. 1 with the overfolding incomplete.

Referring now, more particularly, to FIGS. 1 and 2 of the drawings, there is here shown a section 10 of a herringbone corrugated thin stainless steel strip 12, preferably ferritic stainless steel. Along the left hand edge 14, the strip 12 has been overfolded, or reverse folded over the main body of the strip 12 to form a longitudinally extending reinforcing band 16. The reinforcing band 16 is folded inward toward the center of the strip 12 a distance which is generally from about 5% to about 25% of the width of the original strip, for example, a ½" band width from a strip having an original width of 4.25" is about 11.76% to yield a final width of 3.75". If an opposing band 18 of equal width is provided along the opposing longitudinal edge, the percentage is about 21.05% of the original width for the same final width of 3.75." Normally, the final width of the strip after overfolding will be from about 2.0" to about 6.0." The length of the strip will vary from about 2' to about 25' for a spirally wound core or folded core.

Figure 3:
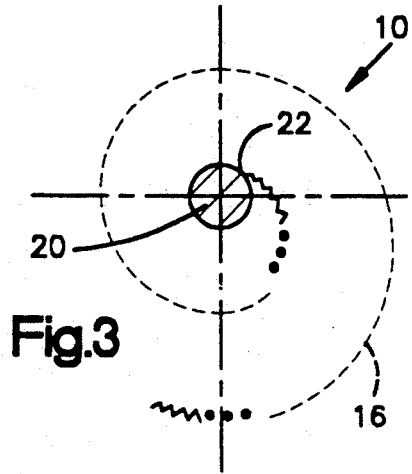
FIG. 3 is a end view of a core element formed from the corrugated reinforced strip of FIGS. 1 and 2 spirally wound about a central electrically conducting post in somewhat expanded condition, i.e., not tightly wound.
Figure 4:
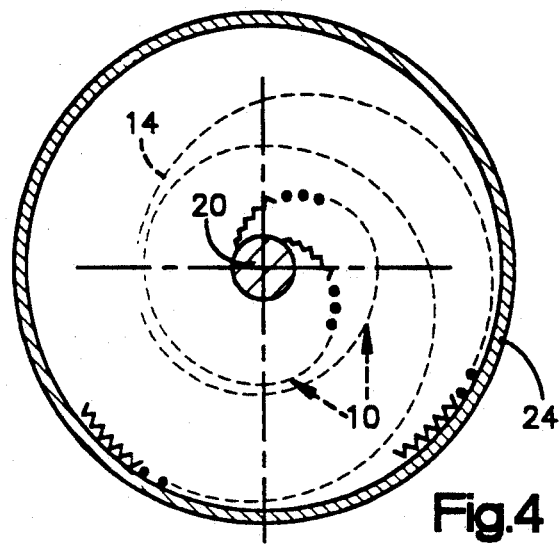
FIG. 4 shows a cross-sectional view of a tightly wound core body encased in a retainer shell of circular configuration.

In fabricating a spirally wound catalytic core member for use in an electrically heatable catalytic converter, the corrugated core element is desirably welded at one end to an electrically conducting center post. Thus, in FIG. 3, there is shown a corrugated strip 10 loosely spirally wound about a cyclindrical central electrically conducting core post 20 formed of stainless steel, e.g., ferritic stainless steel, or nickel. The strip 10 is welded to the post 20 as at 22. One or more, up to 10, core elements 10 may be secured to the central post 20. As shown in FIG. 4, the core elements 10 are tightly spirally wound about the central post 20, and retained by a surrounding circularly configured annulus of steel, or ferritic stainless steel, or nickel retainer 24, to which the opposite end of the core member 10 is also welded. (See FIG. 4) An electric current may thus be passed from the outer retaining shell 24 to which the negative pole of a voltage source may be attached, to the central post 20 to which the positive pole of a voltage source is attached through the core element 10 which, being electrically conducting, acts as it own resistance. Hence, the core elements 10 can be electrically heated as indicated in our copending application Ser. No. 587,219, supra.

FIG. 5 shows a cross-sectional view of an electrically heatable catalytic converter generally indicated at 119 embodying a core, generally indicated at 130, such as that shown in FIG. 4, and connected in a suitable electrical circuit for rapid heating to a desired temperature for optimum catalytic activity. The converter is provided with a stainless steel or nickel housing 120 having flared end caps 122 and 124, and nipples 126 and 128 integral therewith adapted to accommodate a standard exhaust pipe, e.g., a 2.5" internal diameter pipe. The housing 120 contains a single monolith 130 electrically isolated from the housing 120. The monolith shown in FIG. 4 in end view is suitable and may be formed in the manner indicated above of a refractory metal oxide coated, e.g., gamma alumina/ceria coated corrugated thin ferritic stainless steel, and having a noble metal catalyst deposited thereon. As indicated, the process steps disclosed in U.S. Pat. No. 4,711,009, supra, may conveniently be used to accomplish the wash coating and catalyst application. The monolith defines a plurality of cells permeable to exhaust gas. The edge 14 (FIG. 1) which first encounters the exhaust gas is called the leading edge, while the edge 15 (FIG. 1) at the downstream side of the catalytic converter 130 is called the trailing edge. Such cells are diagrammatically shown in FIG. 5 as a plurality of parallel lines. As indicated above, these cells may be non-straight-through as produced with a herringbone, truncated herringbone, chevron or sinusoidal pattern, or be straight-through as described above with reference to U.S. Pat. No. 4,810,588, supra. The cell density is desirably in the range of from about 75 cells per square inch to 500 cells per square inch, preferably from about 100 to about 200 cells per square inch. The refractory metal oxide coating is very thin, e.g., about 0.0005" to 0.002" applied as a washcoat and baked to fuse the coating to the stainless steel surface. The gamma form of alumina is preferred. Other refractory metal oxides or mixtures of oxides may be used as the washcoat, e.g., titania, titania/ceria, titania/alumina, alumina/ceria, etc.

Reinforced strips 10 (FIG. 1) are cut to a predetermined length, e.g., 6" to 36" and secured to the central post 134. One or more such strips 10 may be secured to the central post 134, e.g., 1, 2, 3, 4, etc. A button 136 may be welded on the downstream end of the post 134 to close the open end thereof if a tubular post 134 is used. With a solid bar post, such a button 136 is not necessary. The core element strips 10 are then tightly spirally wound about the central post 134 to which post they are welded or brazed after removal of the refractory metal oxide coating in the end area where welding or brazing occurs. The refractory metal oxide coating has also been removed from the free end of the reinforced core element 10 to enable welding to the retaining shell 138. The whole bundle is then wrapped with a brazing foil strip, of the type described above, and a retaining shell 138 placed about the bundle, preferably as two half-shells, one half shell having a terminal post 140 entending therefrom for attachment of one pole of a cable, diagrammatically shown at 150, from a voltage source 156. The half-shells are seam welded together. The assembly is then heated, e.g., inductively heated, to the fusion temperature of the nickel brazing alloy to secure the retaining shell 138 to the bundle 132. If the brazing temperature is found to be too high for the catalyst, the application of the catalyst may be deferred until after the brazing step, the catalyst then being applied by dipping and baking at a lower temperature. Induction heating is also less injurious to the catalyst.

The assembly is then wrapped in insulation 142 desirably about 1/16 to about ¼ inch thick and inserted into the housing 120. A suitable ceramic felt is described in U.S. Pat. No. 3,916,057 to Hatch dated Oct. 28, 1975. The end caps 122 and 124 are the last to be attached as by welding.

Temperature of the device may be sensed by a thermocouple 194 having a junction 195 embedded in the core 130, the leads being isolated from the end cap 124 by means of an insulator 146 and a bushing 148 extending through the end cap 124.

The terminal post 140 extends through the housing 120 and is desirably threaded at its distal extremity to accept a nut to hold a cable schematically shown at 150 leading through a switch 152 and power switching means 154 as above described. Desirably, the post 140 is attached to the positive pole of a direct current or rectified current source. The power switching means 154 is connected to a battery 156, or alternator, or both, to provide a driving force or voltage of from 12 to 108 volts. The post 140 is provided with an insulating sleeve 158 and a bushing 160, and a metal cap 162 as a seat for a cable connector, not shown.

The opposite, or negative pole in this case, is connected from the outside of the housing 120 by a transversely extending bar 164 welded at each end to the inside of the end cap 122 and to which the central post 134 is welded as at 166. Thus, the electrical circuit is completed from the central post 134, through the foil elements 10, through the retaining shell 138 and terminal 140.

The catalytic converters hereof are referred to as "electrically heatable." This is to suggest that electric power is supplied to the converter while the engine is at rest prior to start-up, and, if necessary, during operation at any time the temperature falls below a set point. This can be achieved by suitable temperature controls at critical points, e.g., within the respective catalytic converters, (such as shown in FIG. 6) which respond to low temperatures to cause reapplication of power as may be needed.

Referring now to FIG. 6, there is here shown a diagrammatic representation of an internal combustion engine generally indicated at 170 and shown in block phantom, and having a manifold 172 connected to individual exhaust lines 174, 176, 178, and 180 leading from exhaust ports 182, 184, 186, and 188, respectively, in the engine block 170. At the downstream end of the manifold 172, there is inserted in the exhaust system, generally indicated at 190, an electrically heatable catalytic converter 192 such as shown in greater detail in FIG. 5. The distance "a" in FIG. 6 is, for most purposes, less than about 12 inches. Also located in the exhaust line is a conventional catalytic converter 194, not electrically heatable. The downstream end of the manifold 172 is attached to a conventional catalytic converter 194 at its inlet end 196 and the tail pipe attached to the exit 198 from the converter 194. The exhaust pipe 190 enters the electrically heatable catalytic converter 192, as defined herein, at its inlet 200 and exits through the outlet 202. As shown, the electrically heatable catalytic converter 192 is upstream of the conventional catalytic converter 194. The electrically heatable catalytic converter may also be located downstream of the conventional catalytic converter, if desired. The conventional catalytic converter, which is not electrically heatable, may comprise a steel housing with end cap adaptors to the exhaust pipe diameter and a ceramic monolith including a catalyst, catalyst coated alumina beads, or a catalyst supporting corrugated thin metal foil monolith as described in the aforesaid U.S. Pat. No. 4,711,009.

Where the engine is constructed with two manifolds as in a V-8 or V-6 engine, two electrically heatable catalytic converters may be used, one in each of the exhaust systems, in the same manner as shown in FIG. 6, for example.

In operation, the electrically heatable catalytic converter as described herein is connected in a suitable electric circuit by closing a normally open switching circuit containing one or more MOSFET's in parallel until a desired temperature is reached in a period of time of from 2 to 30 seconds, or in the event of cold weather operation, until the exhaust system reaches normal operating temperature. At such time as the main, or conventional, catalytic converter has achieved optimum temperature for the desired conversion of pollutant ingredients, application of electrical power may be discontinued or controlled at a much lower energy level. Also, the MOSFET switches may be turned back on after engine start-up to maintain temperature, which temperature, in many cases, will drop in the absence of additional power because of the mass flux in the initial cool exhaust gas flow. Moreover, the MOSFET switches can be turned on and off rapidly so as to provide just the right amount of power to balance any cooling effect. Closing of the MOSFET switch may also activate a "wait" light visible to the driver, and or disable the ignition switch until minimum catalyst operating temperature is reached as sensed by a conventional thermocouple as above described.

There has thus been provided an improved core element structure for use in an electrically heatable catalytic converter which resists "roll-over" failure when submitted to a severe screening test as above described. This improvement is achieved by rolling over the edge (or both edges) once, or twice, for example, to strengthen the edge and prevent "roll-over" failure due to high temperature and high gas velocity.

What is claimed is:

1. A corrugated thin metal foil strip having a longitudinally extending center line with an initial strip width and having at least one longitudinal edge folded toward the center line of the strip prior to corrugating said strip to form a folded section and a remaining portion of the strip which is unfolded, the width of the folded section being from about 5% to about 25% of the width of the remaining portion of the strip which is unfolded.

2. A corrugated thin metal foil strip in accordance with claim 1 wherein the foil is corrugated in a herringbone, chevron, truncated herringbone, or sinusoidal pattern.

3. A corrugated thin metal foil strip in accordance with claim 1 wherein the foil is overfolded along one edge toward the center line of the strip.

4. A corrugated thin metal foil strip as defined in claim 1 wherein the foil strip is overfolded along both longitudinal edges.

5. A corrugated thin metal foil strip as defined in claim 1 wherein the corrugations have a pitch of from about 0.02" to about 0.2" and an amplitude of from about 0.02" to about 0.25".

6. A corrugated thin metal foil strip as defined in claim 1 wherein the foil has a thickness of from 0.001" to about 0.005".

7. A corrugated thin metal foil strip as defined in claim 1, wherein the metal is stainless steel.

8. A corrugated thin stainless steel strip as defined in claim 7 wherein the stainless steel is a ferritic stainless steel.

9. A corrugated thin metal foil strip in accordance with claim 1 further comprising a refractory metal oxide coating on at least one surface thereof, and a noble metal catalyst deposited on said refractory metal oxide coating.

10. A corrugated thin metal foil strip as defined in claim 9 wherein the refractory metal oxide coating comprises a major proportion of alumina.

11. A corrugated thin metal foil strip as defined in claim 10 wherein the alumina is gamma alumina.

12. A core for an electrically heatable catalytic converter including a core member having a predetermined geometric configuration and comprising a corrugated thin metal foil strip having a predetermined length, and a predetermined width, said foil strip being overfolded prior to corrugating said strip along at least one edge to form a folded section and a remaining portion of the strip which is unfolded, the width of the folded section being from about 5% to about 25% of the width of the remaining portion of the strip which is unfolded, said corrugated foil strip being spirally wound about an electrically conducting central metal post with at least one overfolded edge on the outer end of the core, and including a retaining shell tightly surrounding the core and being electrically bonded thereto.

13. A core as defined in claim 12 wherein the geometric configuration is circular.

14. A core as defined in claim 12, wherein the metal is stainless steel.

15. A core as defined in claim 12 further comprising a housing surrounding and supporting said core and insulation means for electrically isolating said core from said housing.

16. A core as defined in claim 15 including means for connecting the central post to one pole of a direct current voltage source, means for connecting the retaining shell to the housing, and means for connecting the housing to the opposite pole of said direct current voltage source.

17. A core as defined in claim 16 wherein the voltage source has a voltage rating of from 12 to 108 volts.

18. An electrically heatable catalytic converter for treating exhaust gas emanating from an internal combustion engine to remove pollutant materials therefrom, said converter comprising (1) an outer metallic housing having inner and outer walls, (2) an end cap adaptor at each end of said housing for adapting the configuration of the outer housing for insertion into a conventional exhaust system for said internal combustion engine, (3) an insulating liner for the inner wall of the housing, (4) a core for said converter within said insulating liner including a core member comprising a corrugated thin metal foil strip having a predetermined length and a predetermined width, the length being greater than the width, said foil strip being overfolded prior to corrugating said strip along at least one longitudinal edge to form a folded section and a remaining portion of the strip which is unfolded, the width of the folded section being from about 5% to about 25% of the width of the remaining portion of the foil strip which is unfolded, said foil strip being spirally wound about an electrically conducting central metal post with at least one overfolded edge on the outer end of the core, and including a retaining shell tightly surrounding said core and being electrically bonded thereto, (5) means for connecting said central post to one pole of a direct current voltage source, (6) means for connecting said housing to the other pole of a direct current voltage source, and (7) a direct current voltage source rated at from 12 to 108 volts.

19. An electrically heatable catalytic converter as defined in claim 18, wherein the metal is stainless steel.

* * * * *